(12) United States Patent
Huang et al.

(10) Patent No.: US 8,745,584 B2
(45) Date of Patent: Jun. 3, 2014

(54) DEPENDENCY INJECTION BY STATIC CODE GENERATION

(75) Inventors: Yunwu Huang, Chappaqua, NY (US); John J. Ponzo, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 1727 days.

(21) Appl. No.: 11/743,939

(22) Filed: May 3, 2007

(65) Prior Publication Data
US 2008/0276231 A1    Nov. 6, 2008

(51) Int. Cl.
G06F 9/44    (2006.01)
G06F 9/445   (2006.01)
G06F 9/46    (2006.01)

(52) U.S. Cl.
USPC ............ 717/121; 717/107; 717/120; 717/131

(58) Field of Classification Search
USPC ................................. 717/120, 121, 131, 107
See application file for complete search history.

(56) References Cited

U.S. PATENT DOCUMENTS

| | | | | |
|---|---|---|---|---|
| 5,493,682 | A | * | 2/1996 | Tyra et al. ..................... 717/122 |
| 5,651,111 | A | * | 7/1997 | McKeeman et al. .......... 714/38.1 |
| 2005/0262482 | A1 | * | 11/2005 | Wagner et al. ................ 717/120 |
| 2007/0083551 | A1 | * | 4/2007 | Jezierski et al. .......... 707/103 R |

OTHER PUBLICATIONS

J. Arthur and S. Azadegan,, "Spring Framework for Rapid Open Source J2EE Web Application Development: A Case Study," Proc. 6th Int'l Conf. Software Eng., Artificial Intelligence, Networking and Parallel/Distributed Computing, IEEE CS Press, 2005, pp. 90-95.*
M. Fowler, Inversion of Control Containers and the Dependency Injection pattern, Jan. 23, 2004.*
H. Cervantes and R.S. Hall. "Autonomous Adaptation to Dynamic Availability Through a Service-Oriented Component Model", Proceedings of the International Conference on Software Engineering, May 2004.*
Fowler, "Inversion of Control Containers and the Dependency Injection pattern", Thoughtworks, Jan. 2004, pp. 1-21 http://www.martinfowler.com/articles/injection.html.
Johnson et al., "Spring java/j2ee Application Framework 2.0.5", 2007, (in particular Chapter three, pp. 28-84) http://static.springframework.org/spring/docs/2.0.x/spring-reference.pdf.

* cited by examiner

*Primary Examiner* — Kannan Shanmugasundaram
(74) *Attorney, Agent, or Firm* — Yee & Associates, P.C.; William Stock

(57) ABSTRACT

The illustrative embodiments provide dependency injection by static transformation. Information about a first software module among several software modules is identified. The first software module has a dependency on at least one other software module among the several software modules. Information about the dependency of the first software module on at least one other software module is identified. Using the information about the first software module and the information about the dependency, code is generated for the first software module to resolve the dependency.

17 Claims, 7 Drawing Sheets

```
                                                                    400
     Line#                                                         ↙
        1    <?xml version="1.0" encoding="ISO-8859-1"?>
        2    <module
        3    xmlns:xsi="http://www.w3.org/2001/XMLSchema-
        4    instance"
        5    xmlns="http://www.apache.org/xbean/module/config">
        6         <group>xyz</group>
        7         <name>moduleA</name>
  402 { 8         <version>1.0.0</version>
        9         <description>Module A</description>
       10
       11        <dependencies>
       12           <dependency>
       13              <name>moduleB</name>
  406 {14              <version>1.0.0</version>
       15           </dependency>
404{   16           <dependency>
       17              <name>moduleC</name>
  408 {18              <version>1.0.0</version>
       19           </dependency>
       20        </dependencies>
       21    </module>
```

*FIG. 4*

```
                                                           500
    Line#                                                 ↙
       1    <?xml version="1.0" encoding="UTF-8" ?>
       2    <services xmlns:s="http://xbean.org/schemas/server">
       3        <service id="serviceA" name="ServiceA"
  504 {4             class="xyz.ServiceAImpl"
       5             start-method="start">
       6    508— <constructor-arg index="0"   ref="serviceB"/>
502{506{7    510— <constructor-arg index="1"   value="woody"/>
       8    512— <property name="serviceC"   ref="serviceC"/>
       9        </service>
      10    </services>
```

*FIG. 5*

```
Line#
       ┌ 1    package xyz.moduleA.ver1_0_0; ─── 904
       │ 2
  902 ┤ 3    public class Application implements Runnable {
       │ 4      static boolean initialized = false;
       └ 5
       ┌ 6      public void run {} {
       │ 7        if (initialized)
  906 ┤ 8          return;
       │ 9        initialized = true;
       └ 10
       ┌ 11       (new xyz.moduleB.ver1_0_0.Application()).run();
  908 ┤ 12       (new xyz.moduleC.ver1_0_0.Application()).run();
       └ 13
       ┌ 14       xyz.serviceB serviceB =
       │ 15         (xyz.serviceB)ServiceRegistry.getService("serviceB");
  910 ┤ 16       xyz.serviceB serviceC =
       │ 17         (xyz.serviceB)ServiceRegistry.getService("serviceC");
       └ 18
       ┌ 19       xyz.serviceAImpl serviceA =
  912 ┤ 20         new xyz.serviceAImpl (serviceB, "Woody");
       └ 21
  914 ┤ 22       ServiceRegistry.addservice("serviceA", serviceA);
       └ 23
  916 ┤ 24       serviceA.setServiceC(serviceC);
       └ 25
  918 ── 26     serviceA.start();
  920 ┤ 27
       └ 28
```

*FIG. 9*

DEPENDENCY INJECTION BY STATIC CODE GENERATION

BACKGROUND OF THE INVENTION

1. Field of the Invention

The present invention relates generally to an improved data processing system, and in particular, to a computer implemented method and apparatus for managing software dependencies. Still more particularly, the present invention relates to a computer implemented method, apparatus, and computer usable program code for dependency injection by static code generation.

2. Description of the Related Art

A software system is a system implemented in software for accomplishing a given purpose. A software system is also commonly known as a software application. A software component is a self-contained subset of a software system. A self-contained software is a software that can operate to provide a desired function using the code contained in the software. A software component can be developed, maintained, deployed, and evolved separately from other software components.

Software services are software components. Software services are also commonly known as services. Services offer functions that are published through software language interfaces, or meta-data, such that they can be incorporated by other software systems, applications, or services for the functions they provide. Exposing a software function so that the function is usable by other software is called publishing. A software language interface is a way in which the software's function is published. Data about other data is called meta-data.

Services may depend on other services for performing their functions. A service that depends on another service is called a dependent service. A service on which another service depends is called a dependency service. A dependent service depends on a dependency service when the dependent service has to use some function or feature of the dependency service in order to perform the function of the dependent service. The process of depending in this manner is called dependency.

Presently, the dependency of one service on another is implemented in one of two ways. First, the code of the dependency service may be included in the code of the dependent service. Second, a centralized framework is employed that manages all the services, and provides methods for a dependent service to locate corresponding dependency services. A centralized framework is a software architecture for facilitating interconnectivity amongst various software applications, components, and services.

SUMMARY OF THE INVENTION

The illustrative embodiments provide a computer implemented method and apparatus for dependency injection by static code generation. Information about a first software module among several software modules is identified. The first software module has a dependency on at least one other software module among the several software modules. Information about the dependency of the first software module on at least one other software module is identified. Using the information about the first software module and the information about the dependency, code is generated for the first software module to resolve the dependency.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts a code segment in a first configuration file in accordance with an illustrative embodiment;

FIG. 5 depicts a code segment in a second configuration file in accordance with an illustrative embodiment;

FIG. 9 depicts a code segment of a stub class generated in accordance with an illustrative embodiment.

DETAILED DESCRIPTION OF THE PREFERRED EMBODIMENT

Figure 1:
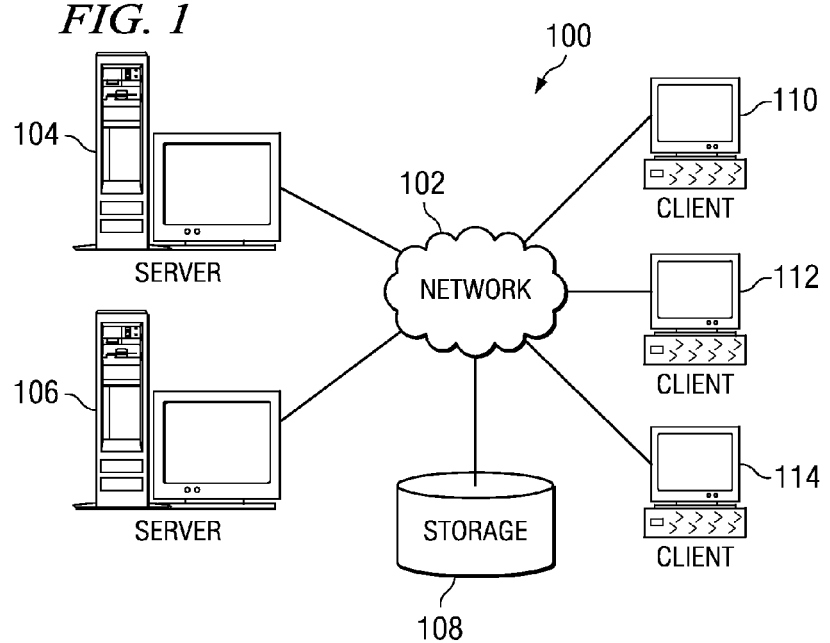
FIG. 1 depicts a pictorial representation of a network of data processing systems in which illustrative embodiments may be implemented.
Figure 2:
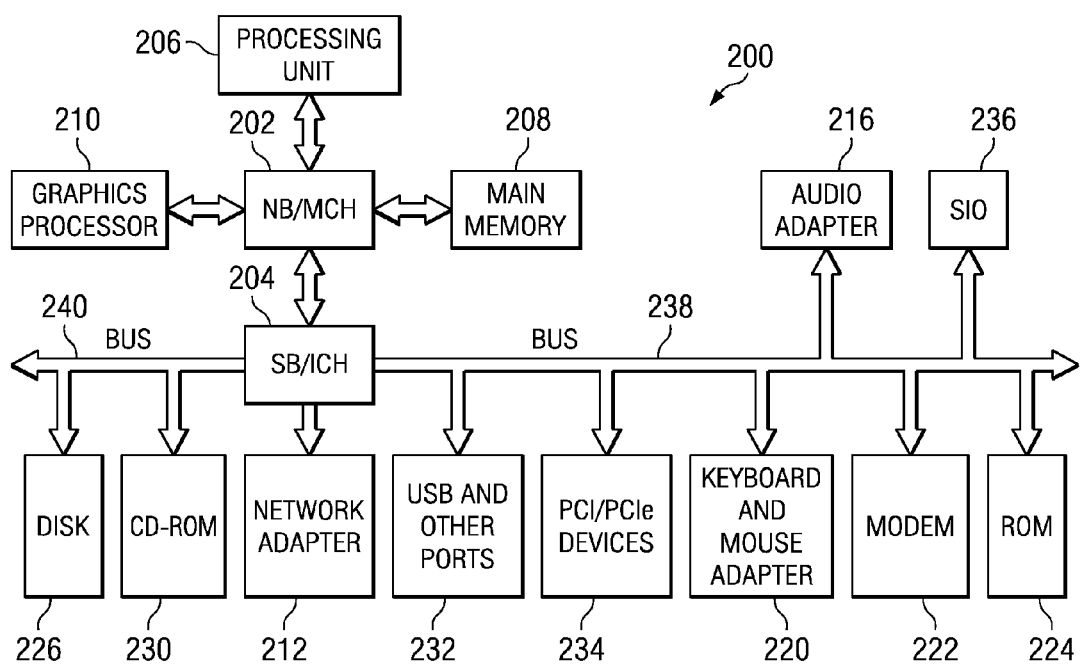
FIG. 2 depicts a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206, and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Software applications can be divided into software components. Software components are also referred to as components. A service is a software component. A set of software components is one or more software components. A set of software components forms a software module. A software module may include other information and code, including code to couple software components within the software module as well as code that references software components from other software modules.

Illustrative embodiments recognize that dividing a software system into components helps to reduce the overall software system complexity, promotes software reuse and in general makes the software system robust. Software design based on certain software concepts or principles is called a software architecture.

A software architecture built using services as described above is called a service-oriented software architecture. A service-oriented software architecture is a software architecture in which software components with well-defined and exportable functions are modeled as services. The functions performed by a service can be presented to other software applications and services for their use. A method of presenting the service functions is called exporting the function. A function of a service that can be exported in this manner is called an exportable function. A well-defined function is a function that can be invoked with a set of known parameter data structures and returns results in known data structures. In object-oriented language such as Java or C++, a service is typically implemented as a class and the functions provided by the service are typically implemented as methods of the class.

In a software system, a service may perform complex business logic that references services from other software applications. Referencing other services in this manner forms dependency relations from a service to other services from other software applications. Thus, a dependent service is said to depend upon one or more dependency service, as described above.

Presently, the dependency from a dependent service to a dependency service is typically implemented in the class of the dependent service. A class of a service, such as a dependent service, is the definition of the service. In this type of implementation, the class of the dependent relies on an instance of the dependency service. An instance of a service, such as a dependency service, is a software object manifesting the service created based on the class of the service. The class of the dependent service then invokes a method of the instance of the class of the dependency service.

One design decision in managing service dependency is how a dependent service resolves the dependency at runtime. Resolving a dependency is resolving an instance of a dependency service, which is identifying the instance of the dependency service that is to be used. Runtime is the time of operation of the software system. Resolving a dependency at runtime is resolving the dependency at the time of operation of the software system.

Traditionally, the resolution of dependency services has been achieved through two methods. First method involves hardcoding the classes of the dependency services in the dependent service class. For example, inside the Java class implementation of a dependent service, for each of dependency service that the dependent service depends on, a "new" method is called on the dependency service class to create an instance of that dependency service. This method is called the hardcoding-services method.

The second method is to employ a centralized framework that instantiates and stores all services in something like a registry structure, while providing methods for each service to locate the instances of corresponding dependency services. This method is called the framework-locating-services method. Based on this framework-locating-services method, a dependent service incorporates code to query the framework. The query retrieves the instances of the dependency services of the dependent service. The dependent service may bind the retrieved instances of dependency services to their respective interfaces, not implementation classes.

Resolving and binding the dependent and dependency services in this manner is called service wiring. The illustrative embodiments recognize that these traditional methods in service wiring have some drawbacks. The hardcoding-services method tightly couples a dependent service with the implementation classes of the dependency services at the source code level. In coupling in this manner, the source code of the dependent service has to be changed if changes have to be made to the implementation classes of one or more dependency services.

Continuing with the disadvantage, the framework-locating-services method tightly couples a dependent service with the framework methods for locating the instances of the dependency services. In coupling in this manner, the source code of the dependent service has to be changed if the framework or framework methods change.

Presently, a type of framework exists for j2EE environments that attempts to address the drawbacks identified above. This framework is called the Inversion-of-Control (IoC) framework. Inversion-of-Control (IoC) framework provides lightweight software containers as an integration framework to wire Java services. A software container, or container in short, is a software component that manages at runtime a collection of other software objects. A lightweight container is a container, which creates an operational burden smaller than that caused by non-lightweight containers. The non-lightweight containers are called heavy-weight containers. The size of the operational burden of a lightweight container versus a heavy-weight container may be determined by the memory used by the container, and types and complexity of operations performed by the container. For example, Enterprise JavaBeans (EJB) is a set of specifications that when implemented generally constitutes a heavy-weight container The Inversion-of-Control framework is based on a software concept called the separation of concerns concept. The separation of concerns is a concept that specifies that a complex software system should be partitioned such that each component has a clearly defined focus or interest while the overlap of functions between components is minimized. Inversion-of-Control framework focuses on the separation of concerns between a framework, the services hosted on the framework, and among services themselves.

Inversion-of-Control framework conceptualizes that a service should focus entirely on the service's business logic and not on how the service interfaces with the framework and other services. Inversion-of-Control framework further conceptualizes that a dependent service should not embed code containing either the implementation classes of the dependency services or framework methods for locating the dependency services. The Inversion-of-Control framework provides that all dependency services of a dependent service are properly wired and their lifecycle managed. Lifecycle of a service is a lifecycle of an instance of that service, and represents the activities with respect to the instance between the time of creation of that instance to the time of destruction of that instance.

A design technique employed by the Inversion-of-Control framework for properly wiring dependencies is called dependency injection. Wiring the dependencies is connecting the dependent and dependency services and other objects according to the dependency amongst them. Dependency injection is the technique for the Inversion-of-Control framework container to resolve and create the instances for all the dependency services of a dependent service, and inject these instances into the dependent service. Thus, services are mutually encapsulated by the Inversion-of-Control framework as their implementation details are known only by the framework, not between the services themselves. Performing a dependency injection in this manner is called injecting dependency.

An Inversion-of-Control framework typically specifies a service configuration language and provides a runtime container that wires services through dependency injection. A runtime container is a container that exists at runtime. The configuration language is typically XML. The configuration language is used to define services provided by some software applications, the respective implementation classes of those services, and the respective set of dependency services on which those services depend.

Dependency injection can be implemented in several variations. Two common types are constructor injection and setter injection. In the Inversion-of-Control framework model, all services have to be properly configured in their respective configuration files. To perform constructor injection for a dependent service, Inversion-of-Control framework first determines the implementation classes of the dependency services on which the dependent service depends based on the meta-data in the configuration file associated with the dependent service.

If not already created, Inversion-of-Control framework then creates the instances of the dependency services and passes those instances as references in parameters of the constructor method of the dependent service. A constructor method is a method implemented in a class, called to create an instance of the class. According to a common practice, all references to instances of dependency services of the dependent service are bound to respective local variables inside the constructor method of a dependent service. This practice is used within the implementation class of the dependent service for ease of programmatic access to the instances of the dependency services.

The setter injection allows a dependent service to specify in the configuration file one setter method for each of the dependency services on which the dependent service depends. A setter method is a method implemented in the class of a service. For conducting a setter injection for the dependent service, if not already created, the Inversion-of-Control framework typically first creates the instances of all dependency services on which the dependent service depends. Inversion-of-Control framework then creates an instance of the dependent service. The Inversion-of-Control framework then sequentially invokes each setter method by passing in the reference to the instance of the dependency service associated with that setter method. Typically, a setter method also contains code that binds the reference to the dependency service to a local variable within the implementation class of the dependent service. As in the constructor injection method, this binding is made for ease of programmatic access to the instances of the dependency services.

The illustrative embodiments recognize that the existing Inversion-of-Control frameworks have certain limitations. For example, a software application's services may be managed by an Inversion-of-Control framework. In managing services in this manner, the runtime Inversion-of-Control framework container has to read one or more configuration files in the software application. Reading the configuration files allows the Inversion-of-Control framework to parse the meta-data for services provided by the software application. The Inversion-of-Control framework parses configuration files and performs dependency injection at runtime when the system starts or when a software application is deployed.

The runtime Inversion-of-Control (IoC) container then resolves the dependency services of a dependent service of the software application based on the meta-data from the software application's configuration files. The runtime Inversion-of-Control (IoC) container then creates instances of those dependency services to inject them, through constructor injection or setter injection, into the dependent service.

As the illustrative embodiments recognize, the runtime dependency resolution and injection performed by Inversion-of-Control (IoC) incurs cost. This cost typically affects the software system start-time negatively. Some software applications are short running software applications in that they run for a short period of time as compared to the overall time of operation of a data processing system. Typically, short running software applications, such as Web-based application require fast startup and teardown time. For short running software applications, the present Inversion-of-Control (IoC) framework causes a delay in software application start-time. For a server system that handles numerous short running software applications, the aggregate cost of application start-time affects the server performance negatively.

Therefore, a method and apparatus for enabling software applications to run with smaller startup delay that the present solutions allow would be advantageous. The illustrative embodiments described below provide such a method and apparatus.

The illustrative embodiments provide a method and apparatus to allow software applications to use an Inversion-of-Control (IoC) configuration language for declaring services and information about dependency of those services. Information about the dependency describes the dependency of one service on another service. Using the illustrative embodiments neither the hardcoding-services method nor the framework-locating-services method is needed for service wiring. Furthermore, using the illustrative embodiments, while service dependency is specified in configuration files based on the Inversion-of-Control framework, there is no need for an Inversion-of-Control container at runtime. Therefore, using the illustrative embodiments, the Inversion-of-Control (IoC) runtime container that causes start-up time inefficiency is no longer needed.

Figure 3:
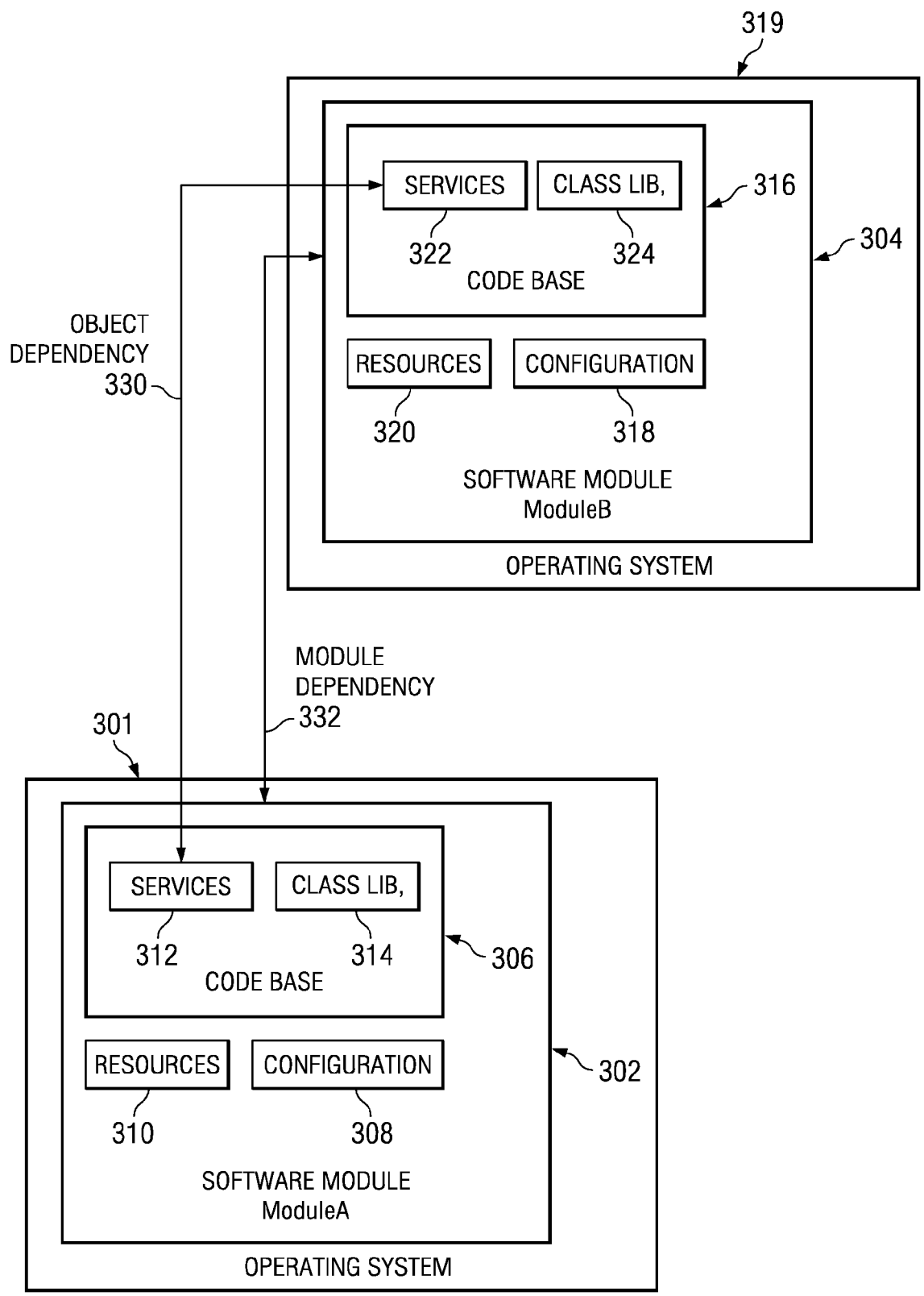
FIG. 3 depicts a block diagram of a Java software system in accordance with an illustrative embodiment.

With reference now to FIG. 3, this figure depicts a block diagram of a Java software system in accordance with an illustrative embodiment. This figure depicts only two software modules for clarity of illustration and is not intended to be limiting on the illustrative embodiment. A Java software system is a software system implemented in Java and designed to run under a Java enabled computing environment. A Java software system may contain more than two software modules in particular implementations of the illustrative embodiment. Additionally, a software module may depend on another software module forming a dependency relationship between software modules.

Software modules and other software applications typically run under an operating system. Software module 302 is shown as running under operating system 301. Other software applications, such as code generation applications, word processors, debugging tools, and many other software applications can similarly run under operating system 301.

Software module 302 includes code base 306, configuration 308, and resources 310. Particular implementations of the illustrative embodiment may include these and other types of information in software module 302. Furthermore, code base 306, configuration 308, and resources 310 may be combined or further broken up in particular implementations of the illustrative embodiment.

Configuration 308 may include one or more files containing meta-data of software module 302. Resources 310 may include any artifacts that software module 302 may need, including but not limited to image files, property files, documents, and application specific data objects.

Code base 306 represents the Java class files that may include service classes 312 and other general library classes 314. A service in Java applications is a Java object defined by a Java class. A service has one or more public methods that execute some service functions.

Service classes 312 and general library classes 314 may be compressed in one or more archive files, such as the JAR (Java Archive). Alternatively, service classes 312 and general library classes 314 can be stored uncompressed within a hierarchical file directory structure as Java class files. Any other organization of data files suitable for storing class files may be used without departing from the scope or spirit of the illustrative embodiment.

Software module 304 is shown as running under operating system 319. Other software applications, such as code generation applications, word processors, debugging tools, and many other software applications can similarly run under operating system 319. Furthermore, in specific implementations, operating systems 301 and 319 may be one and the same.

Software module 304 includes parts similar to those depicted in software module 302. Code base 316 is similar to code base 306; configuration 318 is similar to configuration 308; resources 320 is similar to resources 310; service classes 322 is similar to service classes 312; and general library classes 324 is similar to general library classes 314.

The similarity between each described part of software modules 302 and 304 are similarities in the nature of the contents of the part, and not similarity of the contents themselves. Furthermore, software modules 302 and 304 are shown to include similar parts only as exemplary and are not intended to be limiting on the illustrative embodiment. Particular implementations of the illustrative embodiments may use software modules that are dissimilar with one another.

In the illustrative embodiment, the dependency between software modules 302 and 304 can be conceptually viewed as having two levels. Object dependency 330 represents the dependencies at the services level, formed between services of software modules 302 and 304. Module dependency 332 represents the dependencies at the modular level, formed between software modules 302 and 304.

The grouping of software programs and resources into software modules can be based on function and business usages they provide. Hence, a software module, such as a software module made up of Java classes, can have varying sizes and scopes. A software module in this example may contain a small number of classes bundled into one Java archive, or may contain a large number of classes bundled into many different Java archives.

Object dependency 330 represents dependency among service objects. In FIG. 3, for example, in performing a function, a service object in service classes 312 may need one or more other service objects, such as from service classes 322.

The module dependency 332 describes a high-level dependency relation between two software modules 302 and 304. If one or more service dependency exists from one software module 302 to software module 304, then a module dependency also exists from software module 302 to software module 304. Illustrative embodiments recognize that module dependency may include other kinds of dependency not limited to the dependency injection model. If a class in software module 302 references to another class in software module 304, then also a module dependency 332 exists from software module 302 to software module 304. Illustrative embodiments recognize that a software module may have module dependency to one or more other software modules. Conversely, multiple software modules may have module dependency on a common software module.

With reference now to FIG. 4, this figure depicts a code segment in a first configuration file in accordance with an illustrative embodiment. Configuration file 400 may be implemented in configuration 308 in FIG. 3. Configuration file 400 is depicted as containing configuration code written in XML. However, XML is only used as an example for the clarity of description and is not intended to be limiting on the illustrative embodiment. Other languages suitable for encoding configuration may be used in specific implementations.

Configuration file 400 contains meta-data describing a software module to which the configuration belongs, such as software module 302 in FIG. 3. As an example, code 402 in the configuration file shows information about the software module named "ModuleA", which may correspond to software module 302 in FIG. 3.

The meta-data in configuration file 400 further describes any dependencies of the software module, such as module dependency 332 in FIG. 3. As an example, code 404 defines two module dependencies for software module "ModuleA" identified in code 402. Code 406 shows that "ModuleA" depends on a software module "ModuleB" with the version of "1.1.0". The software module "ModuleB" in this exemplary code may correspond to software module 304 in FIG. 3. Code 408 shows that the "ModuleA" also depends on a software module "ModuleC" with the version of "1.1.0".

With reference now to FIG. 5, this figure depicts a code segment in a second configuration file in accordance with an illustrative embodiment. Configuration file 500 may be implemented in configuration 308 in FIG. 3.

Configuration file 500 is depicted as containing configuration code written in XML. However, XML is only used as an example for the clarity of description and is not intended to be limiting on the illustrative embodiment. Other languages suitable for encoding configuration may be used in specific implementations.

Exemplary configuration file 500 contains the meta-data defining a service in code 502. As depicted in code 504 of configuration file 500, a service is defined with an identifier "serviceA", a name "ServiceA", the implementation class as "xyz.ServiceAImpl" and the start method "start". "ServiceA" may be a service in service classes 312 or general library classes 314 in FIG. 3.

Code 506 in configuration file 500 contains meta-data defining the dependencies of the service. Code 508 describes a dependency service "serviceB" on which dependent service "seviceA" depends. "ServiceB" may be a service in service classes 322 or general library classes 324 in FIG. 3. In an implementation of the illustrative embodiment, a reference of "serviceB" may be passed in as the first parameter of the constructor method of the "xyz.ServiceAImpl" class representing "serviceA". Several parameters may be passed to the constructor method in this manner. As an exemplary second parameter of the possible several parameters, code 510 depicts that the second parameter of the constructor method of the "xyz.ServiceAImpl" class is a string with a value of "woody".

As another example, code 512 describes a dependency service "serviceC" on which dependent service "seviceA" depends. "ServiceC" may be a service in service classes 322 or general library classes 324 in FIG. 3. In an implementation of the illustrative embodiment, a reference of "serviceC" may be passed in as a parameter of the setter method for a property named "serviceC" in the "xyz.ServiceAImpl" class representing "serviceA". In this manner, a service object can depend on a set of other service objects. A set of service objects is one or more service objects.

Furthermore, the values in codes 508 and 512 can be bound to the identifiers or the names of other services defined in the configuration files of software modules other than the software module in which dependent service "serviceA" resides. Dependency services, such as "serviceB" and "serviceC" can also be other services defined in the same configuration file of the dependent service "serviceA".

Figure 6:
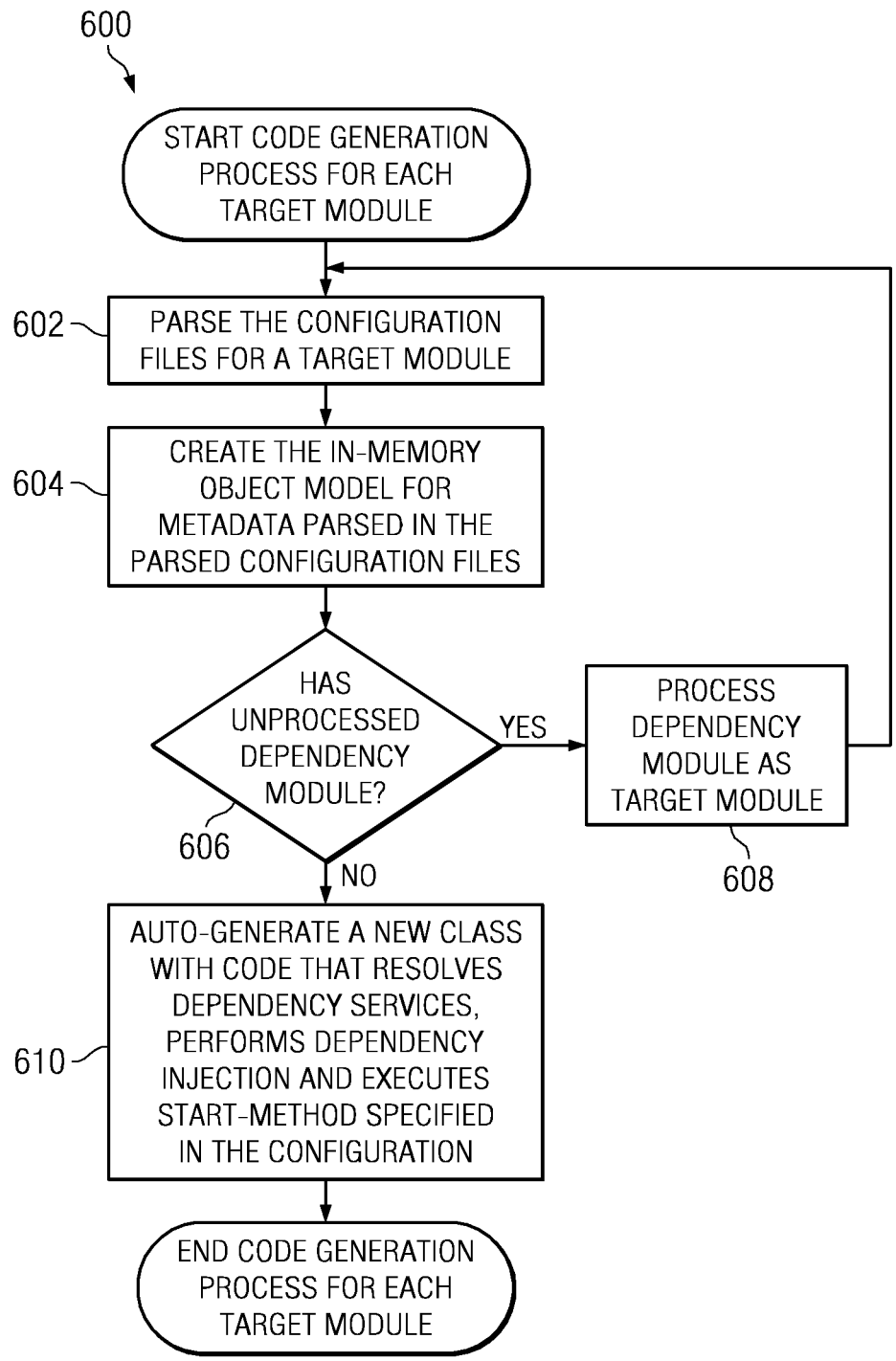
FIG. 6 depicts a flowchart of a high-level method of the Code generation process in accordance with an illustrative embodiment.

With reference now to FIG. 6, this figure depicts a flowchart of a high-level method of the code generation process in accordance with an illustrative embodiment. Process 600 may be a software application implemented to run under operating system 301 in FIG. 3.

The code generation process is a process of generating code by a software process of the method of the present invention. This process is also known as CodeGen process.

Just as there can be dependent services and dependency services with a dependency relationship amongst them, software modules as a whole can have a dependency relationship and depend on one another. When a software module depends on another software module, the software module is called a dependent software module. A software module on which another software module depends is called a dependency software module.

For each dependent software module, the Code generation process first parses the configuration files of the dependent software module (step 602). The process then creates in-memory object structures, modeling the meta-data specified in said configuration files (step 604). An in-memory object structure is a representation of the arrangement of objects with respect to one another, created in a data processing system memory, such as main memory 208 in FIG. 2. The information that the in-memory object structures model may include the general information about a software module, such as module group, module name, module version, and module description as shown in the exemplary code segment in configuration file 400 in FIG. 4. The in-memory object structures modeling may also include the module dependency information. Including the module dependency information allows software applications to trace a dependency from a dependent software module object to the corresponding dependency software module objects in order to access the software module information of the latter. A software module object is an instantiation of a software module as a whole into object.

The in-memory object structures may also model services for each software module, such as defined in the exemplary code segment in configuration file 500 in FIG. 5. The in-memory object structures modeling may include the general service information such as the service identifier, service name, the implementation class of the service, and the "start" method name. The in-memory object structures may also model the service dependency information in the manner described with respect to code segment in configuration file 500 in FIG. 5.

Next, the process checks to determine whether any dependency software modules of the dependent software module are present that have not been processed (step 606). If more dependency software modules remain to be processed ("yes" path of step 606) the process proceeds to process the next dependency software module.

A dependency software module is first processed for its own dependencies, treating the dependency software module as a dependent software module (step 608). Thus, in a recursive manner, the code generation process processes the each dependency software module. A recursive step is a step that begins a new instance of the entire process 600 within the currently executing process 600. The new instance of the process is executed with reference to a different software module than the software module of the currently executing process. Each instance of process 600 running in this manner is called a recursive instance.

When the recursive step 608 ends, parsing and generating of the in-memory object structure of the dependency software modules, on which the dependent software module depends, is complete. At the end of step 608, the parsing and the generating of the in-memory object is complete for the dependent software module as well.

If no more dependency software modules remain to be processed ("no" path of step 606) the process then generates a new class (step 610). The process ends thereafter. The new class generated in the above manner has code that resolves dependency services, performs dependency injection, and executes the "start" method specified in the configuration of each service in the software module. Alternatively, instead of creating a new class, step 610 can modify an existing class with code described above (step 610) When executed, the "start" method of a component starts the functioning of the component and makes the component available according to the design of the software system. Thus, the "start" function of a component includes logic to start the component. The class generation process of step 610 is explained further in FIG. 7.

Code generation process 600 can be executed before runtime. By executing the process prior to runtime, the dependencies are resolved prior to runtime. Resolving the dependencies prior to runtime minimizes the software system's runtime memory requirement, and increases the software system's startup efficiency.

The steps of process 600 are described only as exemplary for the clarity of the illustrative embodiments. The steps may be incorporated in other functions, methods, subroutines, and code sections as appropriate for specific implementations. Furthermore, the steps may be combined, broken down, or implemented in alternative ways in specific implementations, without departing from the scope or spirit of the illustrative embodiment.

Figure 7:
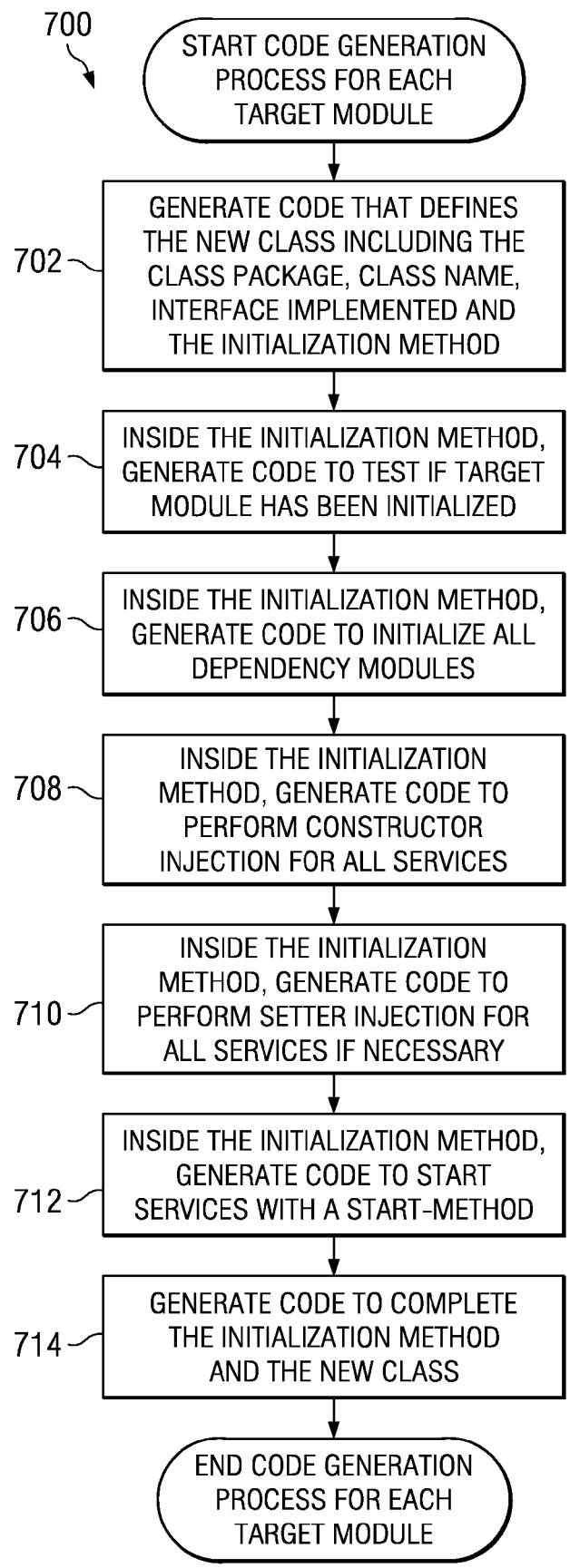
FIG. 7 depicts a flowchart of a class generation process in accordance with an illustrative embodiment.

With reference now to FIG. 7, this figure depicts a flowchart of a class generation process in accordance with an illustrative embodiment. Process 700 may be implemented as step 610 in FIG. 6.

The process first generates the code that defines the class package, package name, one or more default properties, the class name, the interface implemented by the new class and the initialization method (step 702). An initialization method is a class method, which when invoked, initializes certain attributes of the object instance of the class. A class package is a way of organizing classes. The package name, names of default properties, class name, and the interface name can be arbitrarily chosen for different implementations of the illustrative embodiment as long as they do not cause conflict and are consistent within the software system.

Next, the process generates code within the body of the initialization method generated in step 702, to test if the dependent software module has already been initialized (step 704). The code generated in step 704 creates a conditional code block. More code is generated in subsequent steps inside the conditional code block. The code inside the conditional code block will only be executed if executing the code for the test created in step 704 indicates that the dependent software module has not been initialized.

Then, inside the initialization method, the process generates code for ensuring that all depending software modules of the dependent software module are initialized (step 706). Further, inside the initialization method, the process generates code for performing constructor injection (step 708). Code generation in step 708 also creates all service objects defined in the configuration files of the dependent software module. Step 708 is described in more detail in FIG. 8.

Thereafter, inside the initialization method, the process generates code for performing, if specified in the configuration files, setter injection as described above (step 710). Setter injection uses the service objects created in step 708.

Next, inside the initialization method, the process generates code that executes the start methods for service objects created in step 708, if specified in the configuration files (step 712). Finally, the process generates code to complete the definition of the initialization method and the stub class (step 714). The process ends thereafter.

The steps of process 700 are described only as exemplary for the clarity of the illustrative embodiments. The location of performing a particular step, such as inside the initialization method, is not intended to be limiting on the illustrative embodiment. The steps may be incorporated in other functions, methods, subroutines, and code sections as appropriate for specific implementations. Furthermore, the steps may be combined, broken down, or implemented in alternative ways for the purpose, without departing from the scope or spirit of the illustrative embodiment.

Figure 8:
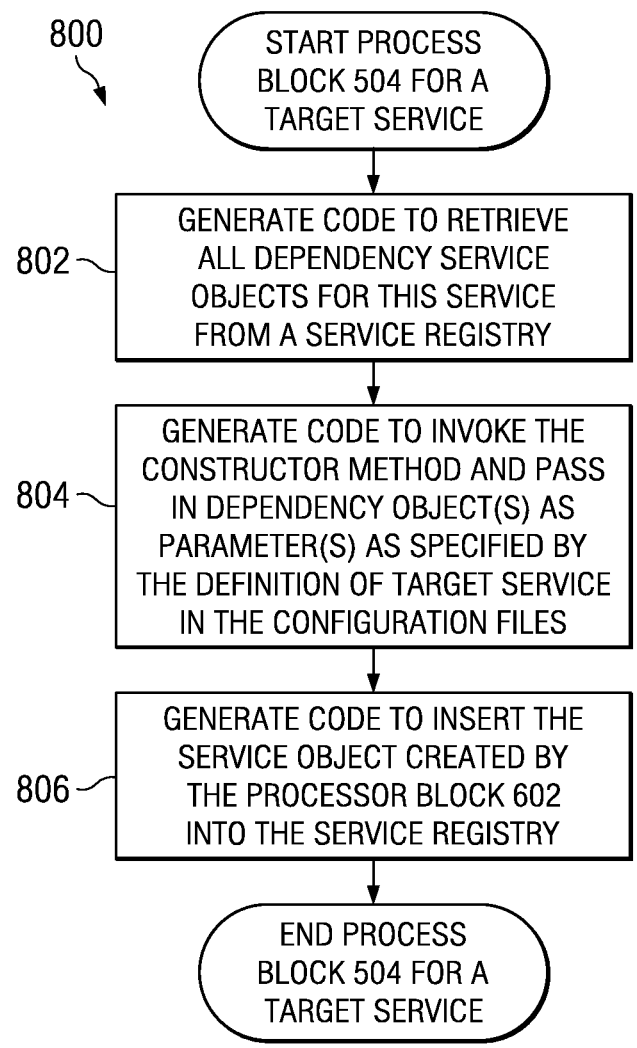
FIG. 8 depicts a flowchart of a code generation process for the code used for constructor injection in accordance with an illustrative embodiment.

With reference now to FIG. 8, this figure depicts a flowchart of a code generation process for the code used for constructor injection in accordance with an illustrative embodiment. Process 800 is a more detailed example of step 708 in FIG. 7.

For each dependent service defined in the configuration files of a dependent software module, the process generates code to retrieve all dependency service objects of the dependent service from a service registry (step 802). These dependency service objects are created in step 706 in FIG. 7. A service registry is a repository of information about the various services.

Next, the process generates code to invoke the constructor method of the dependent service (step 804). The constructor method is invoked in step 804 with the requisite dependent objects passed in as parameters according the definition of the dependent service.

Finally, the process generates code to insert the newly created instance of the dependent service into the service registry (step 806). As a result of invoking the constructor method of the dependent service class in step 804, the code generated in the step 806 creates an instance of the dependent service class.

The steps of process 800 are described only as exemplary for the clarity of the illustrative embodiment. The location of performing a particular step, such as inside the initialization method, is not intended to be limiting on the illustrative embodiment. The steps may be incorporated in other functions, methods, subroutines, and code sections as appropriate for specific implementations. Furthermore, the steps may be combined, broken down, or implemented in alternative ways for the purpose, without departing from the scope or spirit of the illustrative embodiment.

The illustrative embodiments recognize that code generation of Java applications can be based on at least two formats. The first code generation format can be based on the Java programming language. Code in Java programming language results in one or more programs in Java Language. Such programs are typically referred to as ".java" programs. The ".java" programs can then be compiled into ".class" files. The ".class" files resulting from the compilation embed Java code called Java bytecode. Alternatively, code generation of Java applications can directly create Java bytecode stored in the ".class" files, eliminating the need for the compilation of ".java" programs.

With reference now to FIG. 9, this figure depicts a code segment of a new class generated in accordance with an illustrative embodiment. Code segment 900 may result from executing the process in FIG. 7 for software module "moduleA" whose configuration files are shown in FIGS. 4 and 5.

The exemplary code segment 900 is Java language code. Code segment 900 is not Java bytecode for the purposes of this illustrative embodiment. Code 902 is an example of code generated by step 702 in FIG. 7. In code 904, the package name in this example is shown to be "xyz.moduleA.ver1_0_0", using a convention of concatenating group name, module name, and version, and using the period as the delimiter. The class name in this example is "Application". The interface name in this example is "Runnable". The default properties include one exemplary Boolean property called "initialized". The initialization method in this example is called "run( )". In a specific implementation of the illustrative embodiment, the "Runnable" interface can be a Java interface defining a public method called "run( )", which returns void and has no parameters.

Code 906 may be generated by step 704 in FIG. 7. The code in these code lines ensures that a software module is not initialized more than once.

Code 908 may be generated by step 706 in FIG. 7. The information required for this code is retrieved from the information about a software module for generating the conventional package name, and the module dependency information for determining the dependency software modules. The general software module information and module dependency information are configured in the configuration file, such as code segment in configuration file 400 in FIG. 4. The configuration file is parsed and modeled as in-memory objects by the process of FIG. 6.

Code 910 may be generated by step 802 in FIG. 8. The information required to generate this code is defined in the service dependency configuration, such as code segment in configuration file 500 in FIG. 5. The configuration file for the service is parsed and modeled as in-memory objects by the process of FIG. 6. As an example, the ServiceRegstry class can be implemented based on Java HashMap for the storage of service objects and the retrieval of them using service identifier as the key.

Code 912 may be generated by step 804 in FIG. 8. The information required to generate this code is defined in the service dependency and constructor injection configuration, such as code segment in configuration file 500 in FIG. 5. The configuration file for the service is parsed and modeled as in-memory objects by the process of FIG. 6.

Code 914 may be generated by step 806 in FIG. 8. This code ensures that the generated service object is retrievable by other services that may depend on that generated service object.

Code 916 may be generated by step 710 in FIG. 7. The information required to generate this code is defined in the service dependency and setter injection configuration, such as code segment in configuration file 500 in FIG. 5. The configuration file for the service is parsed and modeled as in-memory objects by the process of FIG. 6.

Code 918 may be generated by step 712 in FIG. 7. The information required to generate this code is defined in the service start-method configuration, such as code segment 500 in FIG. 5. The configuration file for the service is parsed and modeled as in-memory objects by in the process of FIG. 6.

Code 920 may be generated by step 714 in FIG. 7. The code generated in the form described above is generated automatically by code generation software applications implementing the processes of the above-described illustrative embodiments. The code generated by the illustrative embodiments that are described above is only exemplary and not intended to be limiting on the illustrative embodiments. The exemplary code in code segment 900 shows that all services are created such that their single instance can be reused by other services in the system. This approach uses a global registry for the storage and retrieval of the service instances.

In some software applications, more than one instance of the services may be desirable. The illustrative embodiments can be implemented such that every time a dependency service object is needed for dependency injection by a dependent service, a new instance of the dependency service object is created without reusing existing object of the same dependency service. This alternative implementation can be configured in the definition of services, for example, by adding an attribute, such as single="false", to general service information definition in code segment in configuration file 500 in FIG. 5. An implementation of the illustrative embodiment can accommodate this alternative approach by generating code that does not attempt to retrieve a single dependency service object from the service registry. Instead, the implementation may call the service factory class associated with the single dependency service to directly create an instance of the single dependency service. The service factory class can be configured in the definition of the service, for example, by adding an attribute such as factory-class="xyz.serviceAFactory".

The illustrative embodiments allow short-running Java applications to enjoy the separation-of-concerns benefits of the Inversion-of-Control (IoC) framework without the runtime start-up inefficiency. The memory requirement of the Inversion-of-Control (IoC) runtime container can also be reduced or eliminated by using the illustrative embodiments.

Furthermore, using the illustrative embodiments, Inversion-of-Control (IoC)-based Java applications no longer need to rely on the hardcoding-services method, or the framework-locating-services method. The illustrative embodiments provide methods and apparatus for harnessing the Inversion-of-Control (IoC) separation-of-concern advantage through service dependency configuration.

The illustrative embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the illustrative embodiments has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for injecting dependency, the computer implemented method comprising:

identifying, by a computer, service dependency information associated with a first software module that includes a set of service software components in a plurality of software modules including other service software components, wherein the first software module includes a service software component in the set of service software components that has a service dependency to at least one other service software component included in another software module in the plurality of software modules;

identifying, by the computer, information about the service dependency to the at least one other service software component included in the another software module; and using the service dependency information associated with the first software module that includes the set of service software components and the information about the service dependency to the at least one other service software component included in the another software module, generating, by the computer, a code for the first software module that resolves the service dependency between the service software component included in the first software module and the at least one other service software component included in the another software module and that allows a software application to trace the service dependency from the service software component included in the first software module to the at least one other service software component included in the another software module, wherein the code for the first software module defines a class, a class package, a package name, one or more default properties, a class name, an interface implemented by the class, and an initialization method, and wherein the generating, by the computer, the code for the first software module comprises:

generating, by the computer, first code inside the initialization method to test whether the first software module is initialized, wherein the first code generated within the initialization method creates a conditional code block within the initialization method that is executed in response to the test indicating that the first software module is not initialized;

generating, by the computer, second code inside the conditional code block of the initialization method that ensures software modules depending on the first software module are initialized;

generating, by the computer, third code inside the conditional code block of the initialization method that performs constructor injection and creates service objects defined in corresponding configuration files of the first software module;

generating, by the computer, fourth code inside the conditional code block of the initialization method that performs setter injection using the created service objects of the first software module;

generating, by the computer, fifth code inside the conditional code block of the initialization method that executes start methods corresponding to the created service objects of the first software module; and generating, by the computer, sixth code to complete a definition of the initialization method and the class.

2. The computer implemented method of claim 1, wherein the computer generates the code for the first software module that resolves the service dependency between the service software component included in the first software module and the at least one other service software component included in the another software module and that allows a software application to trace the service dependency from the service software component included in the first software module to the at least one other service software component included in the another software module before runtime of the first software module.

3. The computer implemented method of claim 1, further comprising:
executing the code for the first software module at runtime.

4. The computer implemented method of claim 1, wherein the code is a Java code, and wherein the Java code is one of code in Java language and Java bytecode.

5. The computer implemented method of claim 1, wherein the code is automatically generated by the computer.

6. The computer implemented method of claim 1, wherein the generating, by the computer, the third code inside the conditional code block of the initialization method that performs constructor injection and creates the service objects defined in the corresponding configuration files of the first software module further comprises:
generating, by the computer, seventh code to retrieve dependency service objects of a first service from a service registry, the first service in a plurality of services that are a part of a software module;
generating, by the computer, eighth code to invoke a constructor method of the first service; and
generating, by the computer, ninth code to insert a newly created instance of the first service into the service registry.

7. A computer implemented method for injecting dependency, the computer implemented method comprising:
identifying, by a computer, service dependency information about a first service software component in a set of service software components included in a first software module in a plurality of software modules that includes other service software components, wherein the first software module has a first dependency to at least one other software module in the plurality of software modules, and wherein the first service software component included in the first software module has a second dependency to at least one other service software component included in another software module in the plurality of software modules;
identifying, by the computer, information about the first dependency between the first software module and the at least one other software module and the second dependency between the first service software component included in the first software module and the at least one other service software component included in the another software module; and
using the service dependency information about the first service software component, the information about the first dependency between the first software module and the at least one other software module, and the information about the second dependency between the first service software component included in the first software module and the at least one other service software component included in the another software module, generating, by the computer, a code for the first software module that resolves the first dependency and the second dependency before runtime of the first software module, wherein resolving the first dependency allows a software application to trace the service dependency from the service software component included in the first software module to the at least one other service software component included in the another software module, and wherein the code for the first software module defines a class, a class package, a package name, one or more default properties, a class name, an interface implemented by the class, and an initialization method, and wherein the generating, by the computer, the code for the first software module comprises:
generating, by the computer, first code inside the initialization method to test whether the first software module is initialized, wherein the first code generated within the initialization method creates a conditional code block within the initialization method that is executed in response to the test indicating that the first software module is not initialized;
generating, by the computer, second code inside the conditional code block of the initialization method that ensures software modules depending on the first software module are initialized;
generating, by the computer, third code inside the conditional code block of the initialization method that performs constructor injection and creates service objects defined in corresponding configuration files of the first software module;
generating, by the computer, fourth code inside the conditional code block of the initialization method that performs setter injection using the created service objects of the first software module;
generating, by the computer, fifth code inside the conditional code block of the initialization method that executes start methods corresponding to the created service objects of the first software module; and
generating, by the computer, sixth code to complete a definition of the initialization method and the class.

8. The computer implemented method of claim 7, further comprising:
identifying a set of service objects on which the first service software component depends.

9. The computer implemented method of claim 8, wherein each service object in the set of service objects is one of a single reusable instance of the service object and a new instance of the service object.

10. The computer implemented method of claim 7, wherein the code is a Java code, and wherein the Java code is one of code in Java language and Java bytecode.

11. The computer implemented method of claim 7, wherein the code is automatically generated by the computer.

12. The computer implemented method of claim 7, wherein the generating, by the computer, the third code inside the conditional code block of the initialization method that performs constructor injection and creates the service objects defined in the corresponding configuration files of the first software module further comprises:
generating, by the computer, seventh code to retrieve dependency service objects of a first service from a service registry, the first service in a plurality of services that are a part of a software module;
generating, by the computer, eighth code to invoke a constructor method of the first service; and
generating, by the computer, ninth code to insert a newly created instance of the first service into the service registry.

13. A computer program product stored on a non-transitory computer readable storage device having computer readable program code encoded thereon that is executable by a computer for injecting dependency, the computer program product comprising:
computer readable program code to identify service dependency information associated with a first software module that includes a set of service software components in a plurality of software modules including other service software components, wherein the first software module includes a service software component in the set of service software components that has a service dependency to at least one other service software component included in another software module in the plurality of software modules;

computer readable program code to identify information about the service dependency to the at least one other service software component included in the another software module; and computer readable program code, using the service dependency information associated with the first software module that includes the set of service software components and the information about the service dependency to the at least one other service software component included in the another software module, to generate a code for the first software module that resolves the service dependency between the service software component included in the first software module and the at least one other service software component included in the another software module and that allows a software application to trace the service dependency from the service software component included in the first software module to the at least one other service software component included in the another software module, wherein the code for the first software module defines a class, a class package, a package name, one or more default properties a class name an interface implemented by the class, and an initialization method, and wherein the computer readable program code to generate the code for the first software module comprises:

computer readable program code to generate first code inside the initialization method to test whether the first software module is initialized, wherein the first code generated within the initialization method creates a conditional code block within the initialization method that is executed in response to the test indicating that the first software module is not initialized;

computer readable program code to generate second code inside the conditional code block of the initialization method that ensures software modules depending on the first software module are initialized;

computer readable program code to generate third code inside the conditional code block of the initialization method that performs constructor injection and creates service objects defined in corresponding configuration files of the first software module;

computer readable program code to generate fourth code inside the conditional code block of the initialization method that performs setter injection using the created service objects of the first software module;

computer readable program code to generate fifth code inside the conditional code block of the initialization method that executes start methods corresponding to the created service objects of the first software module; and computer readable program code to generate sixth code to complete a definition of the initialization method and the class.

14. The computer program product of claim 13, wherein the computer generates the code for the first software module that resolves the service dependency between the service software component included in the first software module and the at least one other service software component included in the another software module and that allows a software application to trace the service dependency from the service software component included in the first software module to the at least one other service software component included in the another software module before runtime of the first software module.

15. The computer program product of claim 13, further comprising:

computer readable program code to execute the code for the first software module at runtime.

16. The computer program product of claim 13, wherein the code is a Java code, and wherein the Java code is one of code in Java language and Java bytecode.

17. The computer program product of claim 13, wherein the code is automatically generated by the computer.

* * * * *